US010082873B2

(12) United States Patent
Zhang

(10) Patent No.: US 10,082,873 B2
(45) Date of Patent: Sep. 25, 2018

(54) METHOD AND APPARATUS FOR INPUTTING CONTENTS BASED ON VIRTUAL KEYBOARD, AND TOUCH DEVICE

(71) Applicant: XIAOMI INC., Beijing (CN)

(72) Inventor: Xu Zhang, Beijing (CN)

(73) Assignee: XIAOMI INC., Beijing (CN)

( * ) Notice: Subject to any disclaimer, the term of this patent is extended or adjusted under 35 U.S.C. 154(b) by 25 days.

(21) Appl. No.: 15/346,314

(22) Filed: Nov. 8, 2016

(65) Prior Publication Data
US 2017/0168574 A1 Jun. 15, 2017

(30) Foreign Application Priority Data
Dec. 11, 2015 (CN) .......................... 2015 1 0921050

(51) Int. Cl.
G06F 3/01 (2006.01)
G06F 3/0488 (2013.01)
G06F 3/041 (2006.01)
G06F 3/044 (2006.01)

(52) U.S. Cl.
CPC ............. G06F 3/016 (2013.01); G06F 3/044 (2013.01); G06F 3/0416 (2013.01); G06F 3/04886 (2013.01); G06F 2203/014 (2013.01); G06F 2203/04101 (2013.01); G06F 2203/04105 (2013.01)

(58) Field of Classification Search
CPC ....................................................... G06F 3/016
USPC ........................................................ 345/174
See application file for complete search history.

(56) References Cited

U.S. PATENT DOCUMENTS

| 2010/0141606 | A1 | 6/2010 | Bae et al. |
| 2011/0115709 | A1* | 5/2011 | Cruz-Hernandez ..... G06F 3/016 345/168 |
| 2013/0088439 | A1 | 4/2013 | Shih et al. |

(Continued)

FOREIGN PATENT DOCUMENTS

| CN | 101957722 A | 1/2011 |
| CN | 103294183 A | 9/2013 |
| CN | 104111724 A | 10/2014 |

(Continued)

OTHER PUBLICATIONS

International Search Report (including English translation) issued in corresponding International Application No. PCT/CN2016/095808, dated Nov. 23, 2016, 4 pages.

(Continued)

Primary Examiner — Long D Pham
(74) Attorney, Agent, or Firm — Arch & Lake LLP

(57) ABSTRACT

Methods and apparatuses are provided for inputting contents based on a virtual keyboard in the field of terminal input. The method includes: detecting a touch operation corresponding to the virtual keyboard; controlling a touch feedback module to send key position feedback information according to a relative position between a touch position of the touch operation and keys of the virtual keyboard; and when the touch operation meets the trigger condition of the target key and a touch pressure of the touch operation is greater than a pressure threshold value, inputting contents corresponding to the target key, and controlling the touch feedback module to send key stroke feedback information.

18 Claims, 8 Drawing Sheets

(56) References Cited

U.S. PATENT DOCUMENTS

2014/0139448 A1* 5/2014 Levesque ............... G06F 3/041
                                                   345/173
2015/0293592 A1* 10/2015 Cheong ................. G06F 3/016
                                                   345/173

FOREIGN PATENT DOCUMENTS

| CN | 104331195 A | 2/2015 |
| CN | 104850344 A | 8/2015 |
| CN | 105446646 A | 3/2016 |

OTHER PUBLICATIONS

Extended European search report issued in corresponding European Application No. 16201714.9, dated Feb. 9, 2017, 9 pages.
International Search Report for PCT/CN2016/095808 dated Nov. 23, 2016.
First Office Action (including English translation) issued in corresponding Chinese Patent Application No. 201510921050.8, dated Jan. 30, 2018, 15 pages.

* cited by examiner

METHOD AND APPARATUS FOR INPUTTING CONTENTS BASED ON VIRTUAL KEYBOARD, AND TOUCH DEVICE

CROSS-REFERENCE TO RELATED APPLICATION

This application is based upon and claims priority to Chinese Patent Application No. 201510921050.8, filed Dec. 11, 2015, the entire contents of which are incorporated herein by reference.

TECHNICAL FIELD

The present disclosure generally relates to technical field of terminal input, and more particularly, to a method and apparatus for inputting contents based on a virtual keyboard, and a touch device.

BACKGROUND

At present, a terminal device, such as a mobile phone, generally adopts a design of touch screen, and thus utilizes a virtual keyboard for a user to input contents, such as characters and instructions.

In related art, the terminal device calls out and displays the virtual keyboard, then after the user selects a target key required to be triggered from the virtual keyboard, a click operation is triggered at a location on the touch screen corresponding to a location of the target key, i.e., the contents corresponding to the target key may be inputted.

SUMMARY

The embodiments of the present disclosure provide a method and apparatus for inputting contents based on a virtual keyboard, and a touch device. The technical solutions are as follows:

According to a first aspect of the present disclosure, there is provided a method for inputting contents based on a virtual keyboard. The method may include: detecting a touch operation corresponding to the virtual keyboard; controlling a touch feedback module to send key position feedback information according to a relative position between a touch position of the touch operation and keys of the virtual keyboard, the key position feedback information being configured to feed back to a user whether the touch operation meets a trigger condition of a target key; and when the touch operation meets the trigger condition of the target key and a touch pressure of the touch operation is greater than a pressure threshold value, inputting contents corresponding to the target key, and controlling the touch feedback module to send key stroke feedback information, the key stroke feedback information being configured to feed back to the user that the contents corresponding to the target key have been successfully inputted.

According to a third aspect of the present disclosure, there is provided a touch device, including: a processor, and a memory, a touch panel, a pressure sensitive module, and a touch feedback module electrically connected to the processor, where the touch panel is located above the pressure sensitive module, the pressure sensitive module is located above the touch feedback module, and the memory is configured for storing executable instructions of the processor. The processor is configured to: detect a touch operation corresponding to the virtual keyboard via the touch panel; control a touch feedback module to send key position feedback information according to a relative position between a touch position of the touch operation and keys of the virtual keyboard, the key position feedback information being configured to feed back to a user whether the touch operation meets a trigger condition of a target key; and when the touch operation meets the trigger condition of the target key and a touch pressure of the touch operation detected by the pressure sensitive module is greater than a pressure threshold value, receive contents input corresponding to the target key, and control the touch feedback module to send key stroke feedback information, the key stroke feedback information being configured to feed back to the user that the contents corresponding to the target key have been successfully inputted.

According to a third aspect of the present disclosure, there is provided a non-transitory readable storage medium including instructions, executable by a processor in a touch device, for performing acts including: detecting a touch operation corresponding to the virtual keyboard; controlling a touch feedback module to send key position feedback information according to a relative position between a touch position of the touch operation and keys of the virtual keyboard, the key position feedback information being configured to feed back to a user whether the touch operation meets a trigger condition of a target key; and when the touch operation meets the trigger condition of the target key and a touch pressure of the touch operation is greater than a pressure threshold value, inputting contents corresponding to the target key, and controlling the touch feedback module to send key stroke feedback information, the key stroke feedback information being configured to feed back to the user that the contents corresponding to the target key have been successfully inputted It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
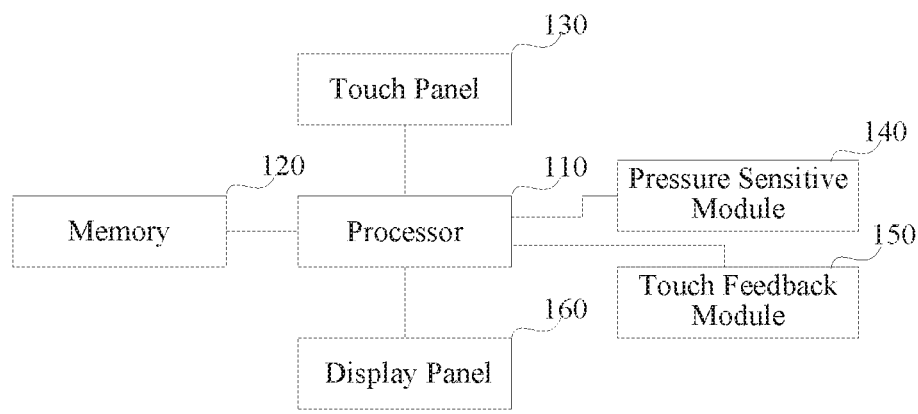
FIG. 1 is a block diagram illustrating a touch device, according to an exemplary embodiment.

These drawings are not intended to limit a scope of the present disclosure in any way, but to interpret an idea of the present disclosure for those skilled in the related art by referring to particular embodiments.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

For a physical keyboard, at least three factors needing to be considered during the design are a key position, a key stroke, and a force feedback. The key position indicates a position of each key and a relative position relationship among keys in the keyboard. The key stroke indicates a procedure in which a key is pressed, and in a narrow sense, the key stroke may means a distance of a key being pressed. The force feedback means a counterforce delivered by a key to a finger of the user during a period from pressing the key to a bounce of the key.

For the physical keyboard, since respective keys are convexly and elastically provided in the physical keyboard, when the user touches the key, relevant contents would not be triggered to be inputted at once. The user achieves a perception of the key position by perceiving a center and an edge position of the key, so as to confirm whether a target key is accurately touched. After confirming that the target key is accurately touched, it is necessary to press the target key downwardly to successfully trigger to input corresponding contents. Thereby, when adopting the physical keyboard to execute the input operation, a misoperation would not be induced easily. In addition, since the physical keyboard can provide the above key position feedback and key stroke feedback to the user, and provide the force feedback to the user during releasing the key, the user is capable of using the physical keyboard to touch type accurately.

For a virtual keyboard, since an input of relevant content is triggered immediately upon a touch, the user cannot achieve a perception of the key position and the key stroke, and thus a misoperation might be induced easily. In addition, the virtual keyboard does not provide the key position feedback, the key stroke feedback and the force feedback to the user, thereby it is difficult for the user to use the virtual keyboard to accurately touch type. In the embodiments of the present disclosure, by simulating the physical keyboard, during the procedure of using the virtual keyboard to execute the input operation, the perception of the key position and the key stroke by the user is achieved via providing the key position feedback, the key stroke feedback and the force feedback to the user, so as to reduce the misoperation, and provide a possibility of using the virtual keyboard to accurately touch type.

In addition, before introducing and explaining the embodiments of the present disclosure, it should be explained first that in the embodiments of the present disclosure, the implementation manners of the virtual keyboard are not limited. For example, the virtual keyboard may be displayed in a display panel of a touch device, or the virtual keyboard may be projected and displayed on a surface of a touch device by adopting projection, or the virtual keyboard may adopt other implementation manner.

Hereinafter, the technical solutions provided by the present disclosure are introduced and explained by using several embodiments.

FIG. 1 is a block diagram illustrating a touch device, according to an exemplary embodiment. As shown in FIG. 1, the touch device includes: a processor 110, and a memory 120, a touch panel 130, a pressure sensitive module 140, and a touch feedback module 150 electrically connected to the processor 110.

The touch panel 130 is configured to detect a touch operation, such as a click, and a swipe. In the embodiments of the present disclosure, in a virtual keyboard input mode, the touch panel 130 is configured to detect a touch operation corresponding to the virtual keyboard, i.e., a touch operation of clicking the virtual keyboard by a finger of the user. In general, a capacitive touch panel may be selected and used as the touch panel 130, which is not limited by the embodiments of the present disclosure, and other types of touch panels, such as a resistive touch panel, an infrared touch panel, or a surface acoustic wave touch panel, may be used.

The pressure sensitive module 140 is configured to detect a touch pressure of the touch operation. In a possible implementation manner, the pressure sensitive module 140 adopts a capacitive pressure sensitive module. The capacitive pressure sensitive module includes a first sensitive layer and a second sensitive layer which are relatively parallel, and there is a certain distance between the first sensitive layer and the second sensitive layer. When power is on, a capacitance is formed between the first sensitive layer and the second sensitive layer. When being pressed by an external force, the distance between the first sensitive layer and the second sensitive layer will change, which results in the change of the capacitance formed therebetween, in this way, by detecting the change of capacitance, a pressure detection may be achieved. The first sensitive layer and the second sensitive layer may be made of a transparent electrode material, such as an Indium Tin Oxide (ITO). In another possible implementation manner, the pressure sensitive module 140 adopts a resistive pressure sensitive module. The resistive pressure sensitive module includes a first sensitive layer and a second sensitive layer which are relatively parallel, and there is a certain distance between the first sensitive layer and the second sensitive layer. When being pressed by an external force, the first sensitive layer may contact with the second sensitive layer, which results in a change of the resistance formed therebetween, in this way, by detecting the change of resistance, a pressure detection may be achieved.

The touch feedback module 150 is configured to send touch feedback information to the user. In the present disclosure, the touch feedback module 150 may send key position feedback information and key stroke feedback information to the user by using different feedbacks. The key position feedback information is sent when the touch panel 130 detects a touch operation, and the key position feedback information feeds back to the user whether the touch operation meets a trigger condition of the target key in the virtual keyboard. The key stroke feedback information is sent after the user presses the target key, and the key stroke information feeds back to the user that contents corresponding to the target key have been successfully inputted. For example, the touch feedback module 150 may include a vibration module. The vibration module may include a vibration plate and a vibration motor, and the vibration plate vibrates under traction of the vibration motor. In other possible implementation manners, the touch feedback module 150 may also be a current feedback module, and the current feedback module stimulates the finger of the user via a weak short-circuit current, so as to achieve the feedback function; or the touch feedback module 150 may also be achieved by combining a vibration module and a current feedback module, or other implementation manners. Additionally or alternatively, other feedback modules may be selected according to user setup and the feedback modules may work independently or concurrently.

Figure 2A:
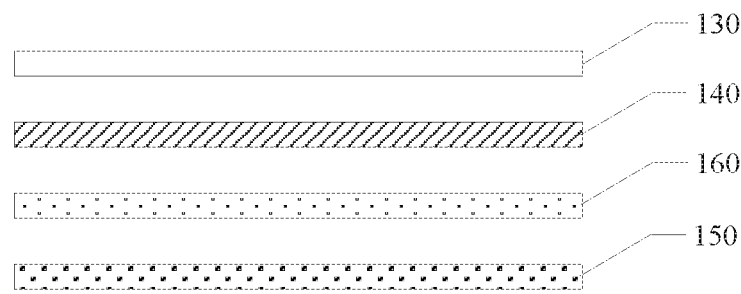
FIG. 2A is a structural diagram illustrating a touch device.

As shown in FIG. 2A, the above touch panel 130 is located above the pressure sensitive module 140, and the pressure sensitive module 140 is located above the touch feedback module 150.

In addition, to provide the feedback to the user more accurately, the design of the touch feedback module is different depending on different types of virtual keyboard. In the present disclosure, the following several possible implementation manners are provided.

1. In combination with FIG. 2B, the virtual keyboard includes a first virtual keyboard that is easily accessible by both hands. Such virtual keyboard is suitable for a terminal device with a large screen, or is suitable for an input device used with a terminal device as well for providing a virtual keyboard inputting function. Accordingly, the touch feedback module 150 includes ten independent touch feedback elements 150a, where each touch feedback element 150a corresponds to a key block corresponding to one finger. After detecting a touch operation, the touch feedback element 150a corresponding to the key block to which the target key belongs sends touch feedback information to the user.

2. In combination with FIG. 2C, the virtual keyboard includes a second virtual keyboard that is easily manipulated by both thumbs. Such virtual keyboard is suitable for a large-size terminal device, such as a mobile phone or a tablet computer. Accordingly, the touch feedback module 150 includes 2 independent touch feedback elements 150a, where each touch feedback element 150a corresponds to a key block corresponding to one thumb. After detecting a touch operation, the touch feedback element 150a corresponding to the key block to which the target key belongs sends touch feedback information to the user.

3. In combination with FIG. 2D, the virtual keyboard includes a third virtual keyboard that is easily manipulated by one thumb. Such virtual keyboard is suitable for a small-size terminal device, such as a mobile phone or a remote control. Accordingly, the touch feedback module 150 includes 1 independent touch feedback element 150a. After detecting a touch operation, the touch feedback element 150a sends touch feedback information to the user.

Figure 2B:
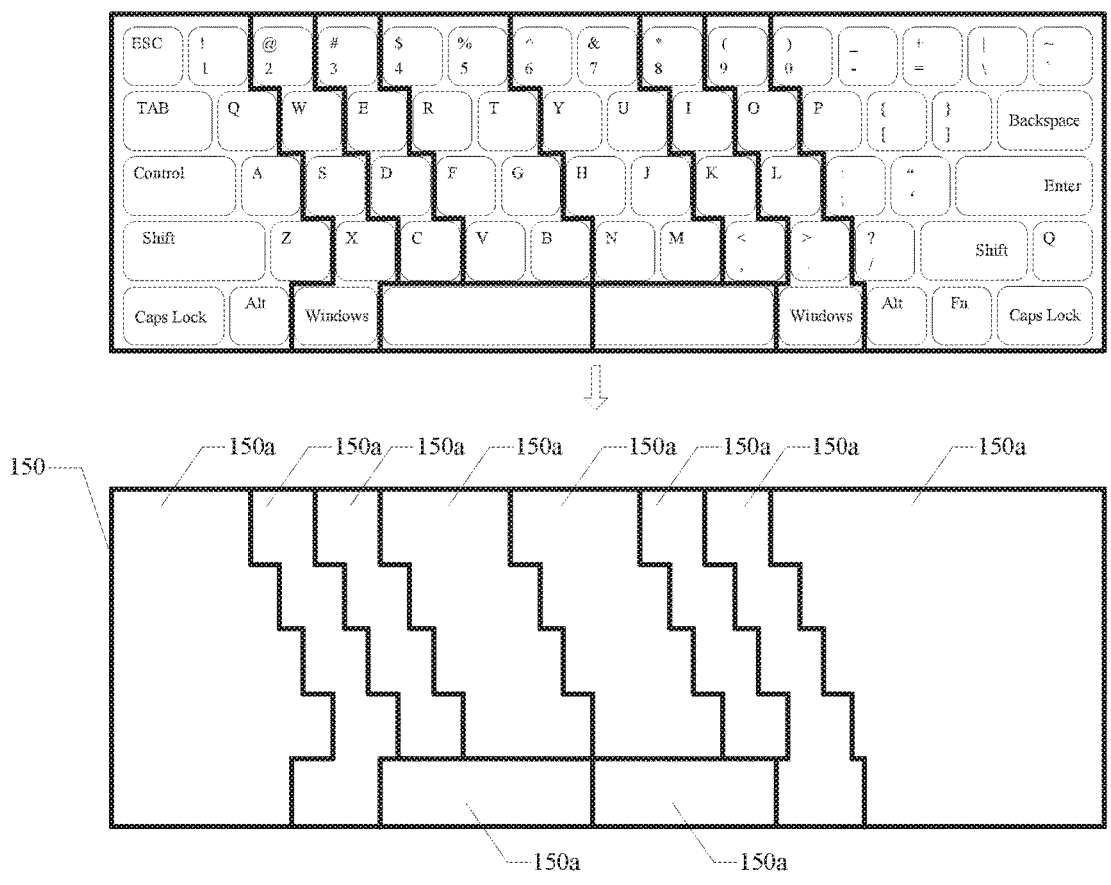
FIGS. 2B-2D are schematic diagrams illustrating three different types of virtual keyboards and corresponding touch feedback modules.
Figure 2C:
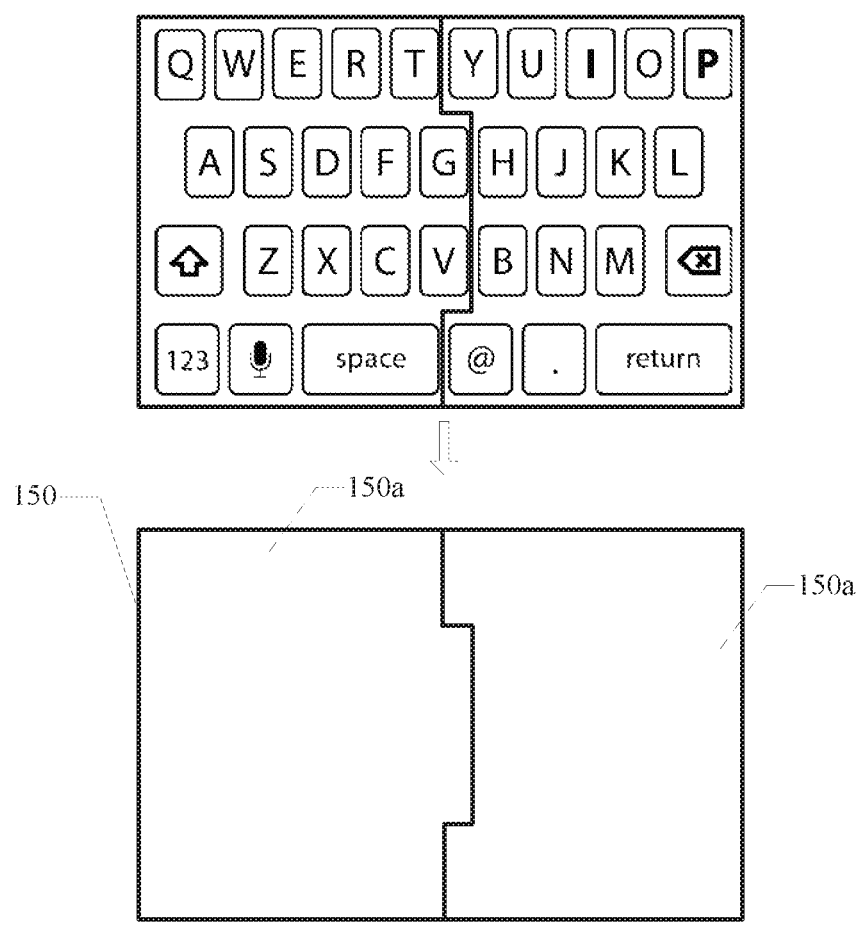
Figure 2D:
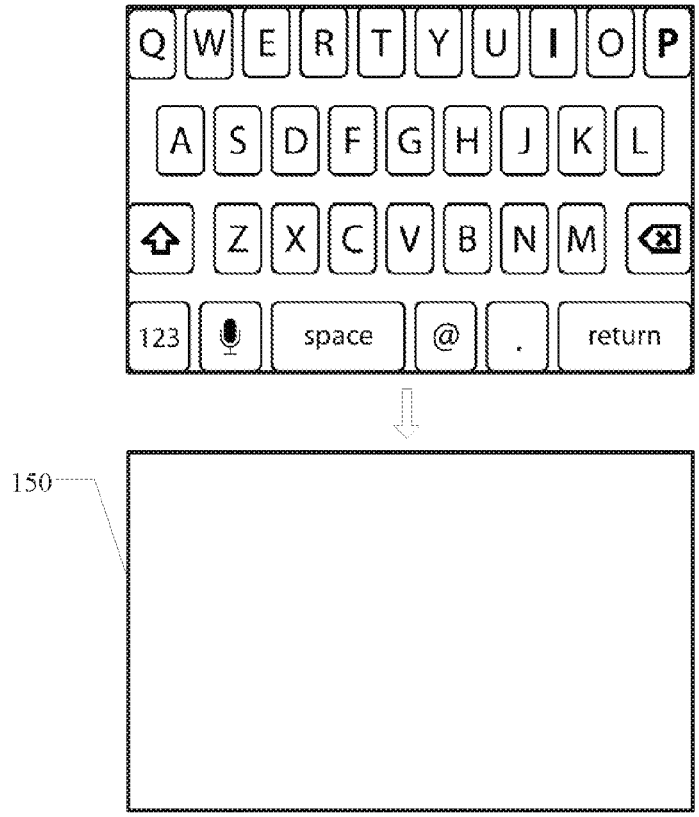

In the embodiments of the present disclosure, with respect to different types of virtual keyboards, depending on a number of fingers required for operating the virtual keyboard, the touch feedback module 150 is divided into the same number of independent touch feedback elements 150a, and each touch feedback element 150a corresponds to a key block corresponding to one finger, in this way, a touch feedback is executed independently for a respective finger, thereby improving feedback accuracy and avoiding interference. In addition, the several different types of virtual keyboards and the division manners of respective key blocks shown in the above FIGS. 2B-2D are only illustrative and explanative, rather than limiting the present disclosure.

Alternatively, when the touch device is a terminal device such as a mobile phone, a tablet computer, or a Personal Computer (PC), the touch device further includes: a display panel 160 electrically connected to the processor 110. For example, the display panel 160 may be a Liquid Crystal Display (LCD) panel, or may be an Organic Light-Emitting Diode (OLED) panel. The display panel 160 provides a human-computer interface to the user. In the virtual keyboard inputting mode, the display panel 160 displays the virtual keyboard. In the case that the touch device includes the display panel 160, the display panel 160 is provided between the touch panel 130 and the touch feedback module 150. The pressure sensitive module 140 may be provided above the display panel 160 (as shown in FIGS. 2B, 2D and 2F), or may be provided below the display panel 160. In other possible implementation manners, the touch device may not include the display panel. For example, the virtual keyboard may adopt a projection mode, in which the projection is displayed on a surface of the touch device.

In addition, the memory 120 is configured to store executable instructions of the processor 110, and the processor 110 is configured to execute the instructions for realizing respective steps in the following method embodiments.

Figure 3:
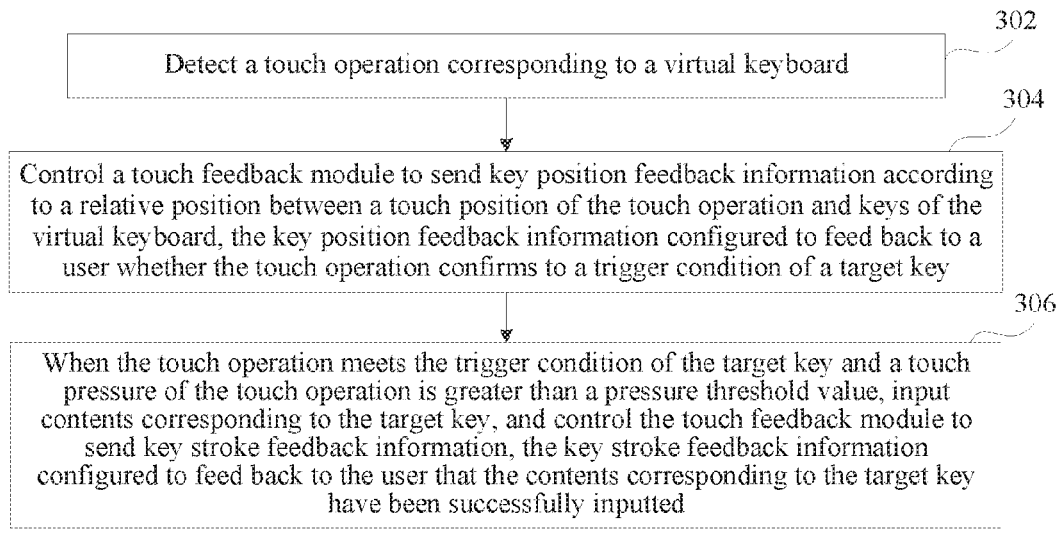
FIG. 3 is a flow chart illustrating a method for inputting contents based on a virtual keyboard, according to an exemplary embodiment.

FIG. 3 is a flow chart illustrating a method for inputting contents based on a virtual keyboard, according to an exemplary embodiment. The method may be applied in the touch device shown in FIG. 1. The method may include the following steps.

In step 302, a touch operation corresponding to the virtual keyboard is detected.

In step 304, a touch feedback module is controlled to send key position feedback information according to a relative position between a touch position of the touch operation and keys of the virtual keyboard, where the key position feedback information is configured to feed back to a user whether the touch operation meets a trigger condition of a target key.

In step 306, when the touch operation meets the trigger condition of the target key and a touch pressure of the touch operation is greater than a pressure threshold value, contents corresponding to the target key are inputted, and the touch feedback module is controlled to send key stroke feedback information, where the key stroke feedback information is configured to feed back to the user that the contents corresponding to the target key have been successfully inputted.

In sum, the method provided by the present embodiment controls the touch feedback module to send the key position feedback information according to the relative position between the touch position of the touch operation and keys of the virtual keyboard, and when the touch operation meets the trigger condition of the target key and the touch pressure of the touch operation is greater than the pressure threshold value, inputs contents corresponding to the target key, and controls the touch feedback module to send key stroke feedback information. Accordingly, the problem in the related art of easily inducing the misoperation when using the virtual keyboard to execute the input operation is solved, the perception of the key position and the key stroke by the user is achieved, and only when accurately touching the target key and applying a certain pressure, the contents corresponding to the target key are triggered to be inputted, thereby efficiently reducing the misoperation induced when adopting the virtual keyboard to execute the input operation.

Figure 4A:
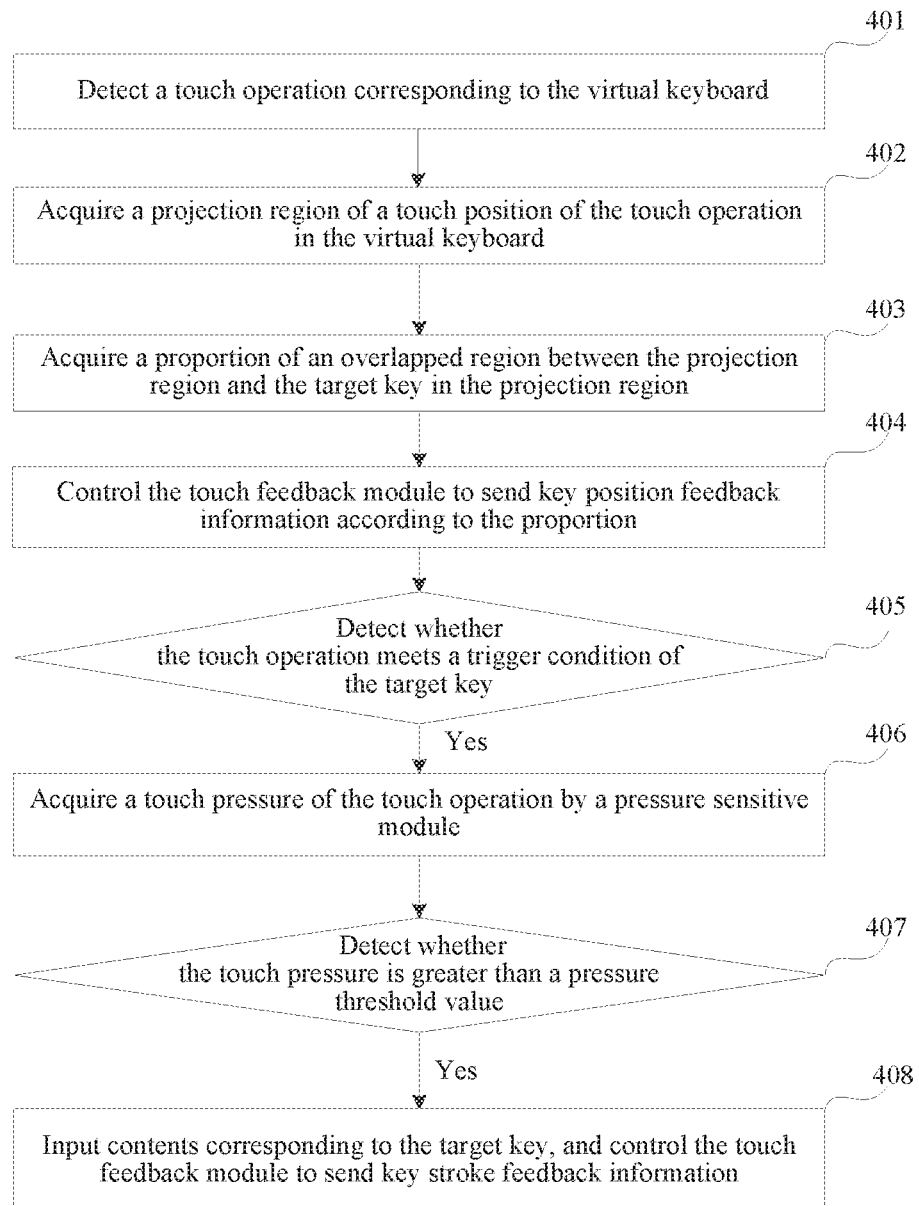
FIG. 4A is a flow chart illustrating a method for inputting contents based on a virtual keyboard, according to another exemplary embodiment.

FIG. 4A is a flow chart illustrating a method for inputting contents based on a virtual keyboard, according to another exemplary embodiment. In the present embodiment, the explanations are given by using an example in which the method is applied in the touch device shown in FIG. 1. The method may include the following steps.

In step 401, a touch operation corresponding to the virtual keyboard is detected.

The touch device detects a touch operation corresponding to the virtual keyboard via a touch panel. The virtual keyboard may be displayed in a display panel of the touch device, or may be projected and displayed on the surface of the touch device by using a projection mode.

In step 402, a projection region of a touch position of the touch operation in the virtual keyboard is acquired.

The touch device acquires the projection region of the touch position of the touch operation in the virtual keyboard. The touch position of the touch operation is generally a planar region having a certain area. The touch device determines a relative position between the touch position and keys of the virtual keyboard by acquiring the projection region of the touch position in the virtual keyboard.

In step 403, a proportion of an overlapped region between the projection region and the target key in the projection region is acquired.

The touch device acquires a proportion of an overlapped region between the projection region and the target key in the projection region. The above projection region may be completely located in a display region corresponding to a certain key; or a part of the above projection region may be located in a display region corresponding to a certain key, and the other part is located outside the display region corresponding to the certain key, for example, the other part is located in a display region corresponding to another key and/or the other part is located in a spaced region between the certain key and another key.

In the present embodiment, when the projection region is completely located in the display region corresponding to a certain key, the touch device determines this key as the target key. When the projection region is partly located in the display region corresponding to a certain key, the touch device calculates proportions of the overlapped regions corresponding to one or more keys overlapped with the projection region in the above projection region respectively, and selects the key corresponding to the maximum proportion as the target key.

The proportion of the overlapped region between the projection region and the target key in the projection region may indicate whether the finger of the user touches the target key accurately. A big proportion indicates that the finger of the user is located at a center position of the target key, and the target key is touched accurately; whereas a small proportion indicates that the finger of the user is located at an edge position of the target key, and the target key is not accurately touched.

In step 404, the touch feedback module is controlled to send key position feedback information according to the proportion.

The touch device controls the touch feedback module to send the key position feedback information according to the proportion. The key position feedback information is configured to feed back to the user whether the touch operation meets a trigger condition of the target key. The trigger condition of the target key includes: the proportion is greater than a proportion threshold value, for example, the proportion threshold value is about 70%. The proportion threshold value may be a value between 65% and 75%. With respect to difference values of the proportion, the touch feedback module sends different key position feedback information, so as to prompt the user whether the target key is touched accurately.

In the present embodiment, for example, a vibration module is used as the touch feedback module. This step may include the following sub-steps.

1. A vibration amplitude of the vibration module is determined according to the proportion.

2. When the proportion is greater than a first threshold value, the vibration module is controlled to vibrate at a high frequency according to the vibration amplitude and a first preset frequency.

3. When the proportion is less than the first threshold value and is greater than a second threshold value, the vibration module is controlled to vibrate at a low frequency according to the vibration amplitude and a second preset frequency. The above first preset frequency is greater than the second preset frequency.

Additionally or alternatively, the above vibration amplitude is in a negative correlation with the proportion. The closer the finger of the user to the center position of the target key is, the less the vibration amplitude is, and the softer the vibration being capable of perceived by the user is; and the closer the finger of the user to the edge position of the target key is, the greater the vibration amplitude is, and the stronger the vibration being capable of perceived by the user is. When the finger of the user is located at a border between two adjacent keys, the vibration amplitude reaches to the maximum, and the vibration frequency is reduced, such that the user can definitely sense a strong vibration, and definitely prompt the user that the currently touched key position is not accurate. In addition, the above first and second threshold values may be set in advance in combination with the key layout of the virtual keyboard. For example, the first threshold value is about 60%, and the second threshold value is about 50%. The first threshold value may be a value between 55% and 65%, and the second threshold value may be a value between 45% and 55%.

By using the above mode, when the user senses a relatively strong vibration, he/she may move his/her finger to touch an accurate key position. During the procedure of moving the finger of the user, the user is guided to move his/her finger to the center position of the target key by adjusting the vibration amplitude and the frequency in real time, so as to meet the trigger condition of the target key.

Figure 4B:
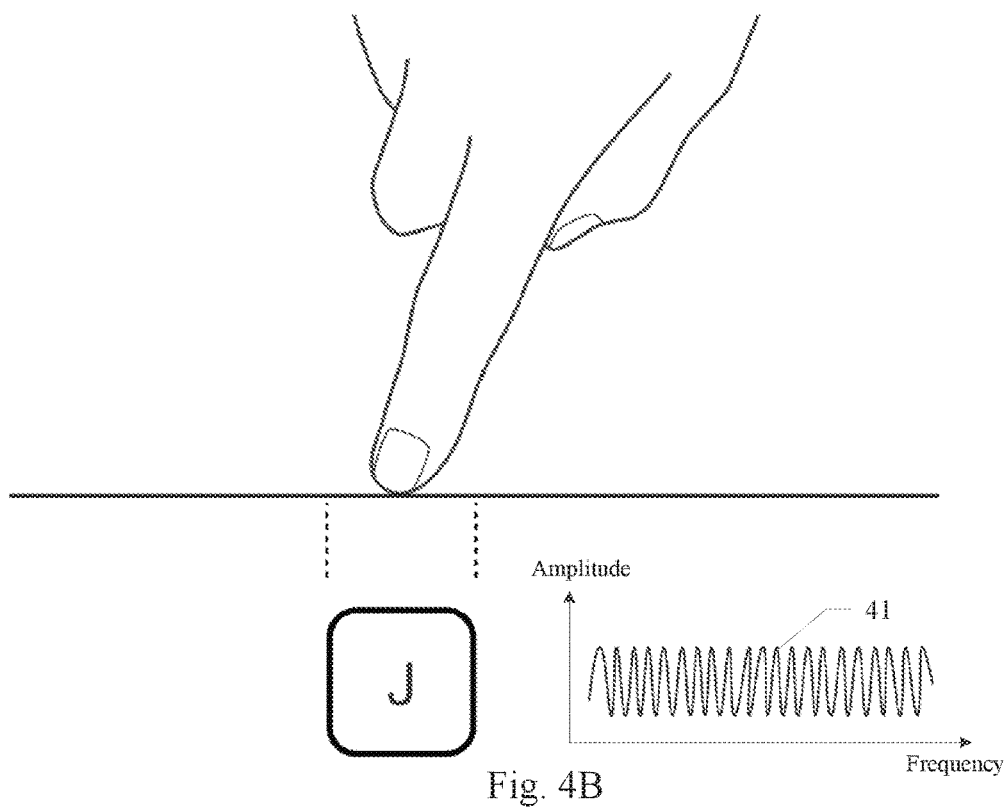
FIGS. 4B-4D are schematic diagrams illustrating three different vibration rhythm curves of the key position feedback.
Figure 4C:
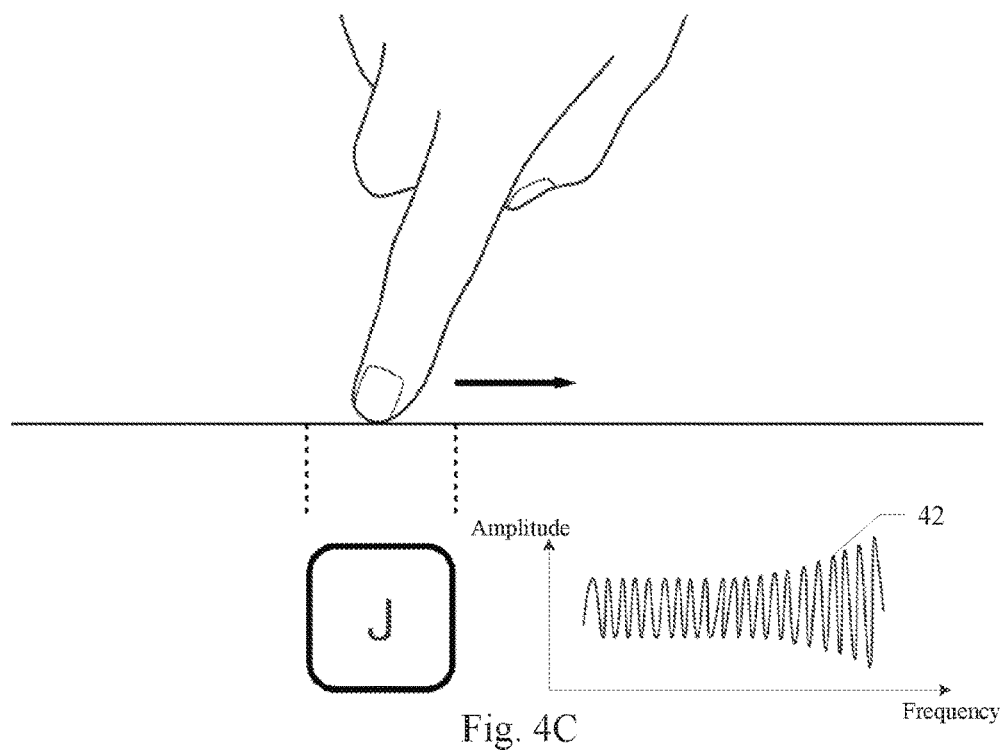
Figure 4D:
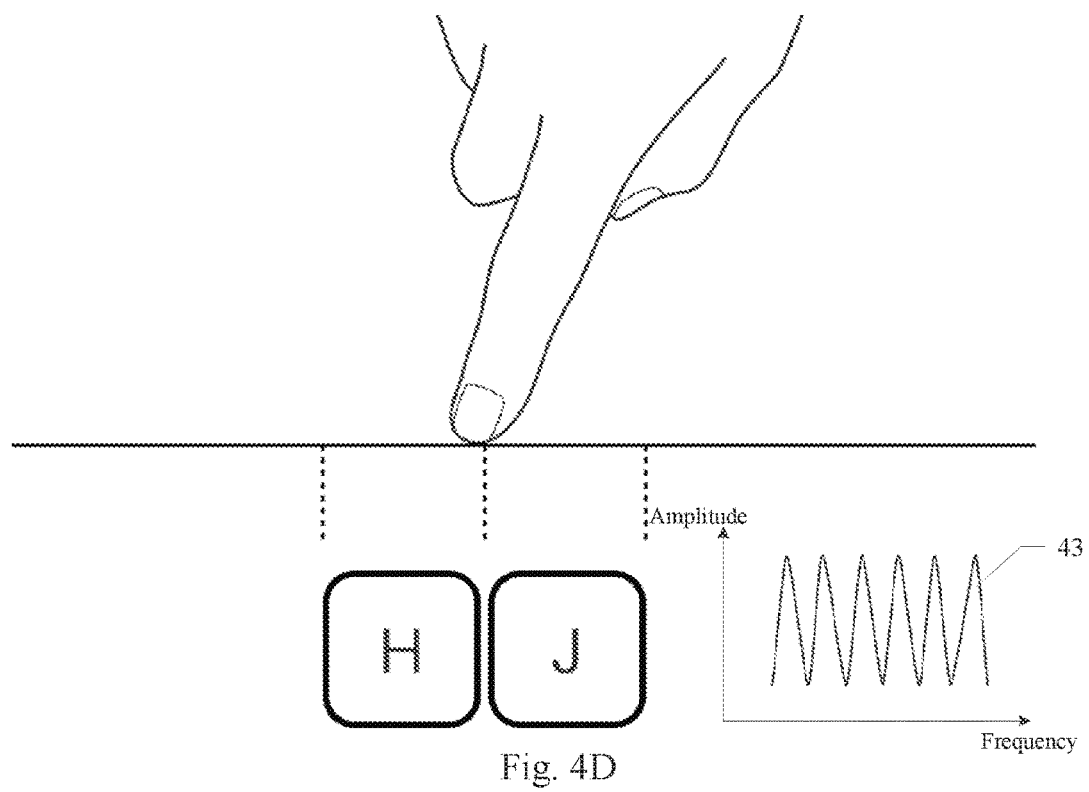

As shown in FIG. 4B, when the touch position of the finger of the user is located at the center position of the key "J", the vibration module vibrates at a high frequency according to a vibration rhythm curve 41 shown in FIG. 4B, and at this time, the vibration amplitude is the smallest. As shown in FIG. 4C, when the touch position of the finger of the user swipes towards the edge position from the center position of the key "J", the vibration module vibrates at a high frequency according to a vibration rhythm curve 42 shown in FIG. 4C, and during the swiping, the vibration amplitude increases gradually. As shown in FIG. 4D, when the touch position of the finger of the user is swiping at the edge position of the key "J" and the key "H", the vibration module vibrates at a low frequency according to a vibration rhythm curve 43 shown in FIG. 4D, and at this time, the vibration amplitude is the greatest.

In addition, when the touch feedback module includes a plurality of independent touch feedback elements, the touch device controls the touch feedback element corresponding to the key block to which the target key belongs to send the above key position feedback information, so as to achieve the touch feedback to respective finger separately, thereby improving the feedback accuracy, and avoiding interference.

In step 405, it is detect whether the touch operation meets a trigger condition of the target key.

The touch device detects whether the touch operation meets the trigger condition of the target key in real time, i.e., detects whether the above proportion is greater than the proportion threshold value. When it is detected that the touch operation meets the trigger condition of the target key, the following step 406 is executed; otherwise, it is continued to detect whether the touch operation meets the trigger condition of the target key.

In step 406, a touch pressure of the touch operation is acquired by a pressure sensitive module.

The touch device acquires the touch pressure of the touch operation via the pressure sensitive module. The pressure sensitive module may be a capacitive type, or a resistive type. The corresponding different pressure detection modes have been introduced before, and would not be elaborated herein.

In step 407, it is detected whether the touch pressure is greater than a pressure threshold value.

The touch device detects whether the touch pressure is greater than a pressure threshold value. When it is detected that the touch pressure is greater than a pressure threshold value, the following step 408 is executed; otherwise, it is continued to detect whether the touch pressure is greater than a pressure threshold value.

In step 408, contents corresponding to the target key are inputted, and the touch feedback module is controlled to send key stroke feedback information.

During the procedure of pressing the touch panel by the finger of the user, the touch pressure increases gradually. When the touch pressure is greater than the pressure threshold value, the touch device inputs contents corresponding to the target key. The contents corresponding to the target key may be a character, an instruction or other content, which is not limited by the present embodiment. Moreover, the touch device controls the touch feedback module to send the key stroke feedback information. The key stroke feedback information is configured to feed back to the user that the content corresponding to the target key has been successfully inputted.

Still using the example that the touch feedback module is the vibration module, the touch device controls the touch feedback module to send the key stroke feedback information, including: the touch device controls the vibration module to perform a first mode vibration according to a first preset vibration amplitude and a third preset frequency. The first mode vibration is configured to simulate a touch sense of typing on the key. The first preset vibration amplitude may be set to be a relatively big value, and the third preset frequency may be set to be a relatively small value, such that the user may sense a short and strong vibration and simulate the touch sense of typing on the key.

Alternatively, after the above step 408, the method provided by the present embodiment further includes the following steps: during the procedure of retracting the finger of the user after the input is completed, i.e., during the procedure of gradually reducing the touch pressure, the touch device controls the vibration module to perform a second mode vibration according to a second preset vibration amplitude and a fourth preset frequency. The second mode vibration is configured to simulate the force feedback during the bounce of the key. The second preset vibration amplitude may be set to be a relatively small value or may be set to be a variable reducing gradually, and the fourth preset frequency may be set to be a relatively big value, such that the user may sense a progressively softening vibration and simulate the force feedback during the bounce of the key.

In addition, when the touch feedback module includes a plurality of independent touch feedback elements, the touch device controls the touch feedback element corresponding to the key block to which the target key belongs to send the above key stroke feedback information, so as to achieve the touch feedback to respective fingers separately, thereby improving the feedback accuracy, and avoiding interference.

In sum, the method provided by the present embodiment controls the touch feedback module to send the key position feedback information according to the relative position between the touch position of the touch operation and keys of the virtual keyboard, and when the touch operation meets the trigger condition of the target key and the touch pressure of the touch operation is greater than the pressure threshold value, inputs contents corresponding to the target key, and controls the touch feedback module to send key stroke feedback information; in this way, the problem in the related art of easily inducing the misoperation when using the virtual keyboard to execute the input operation is solved, the perception of the key position and the key stroke by the user is achieved, and only when accurately touching the target key and applying a certain pressure, the contents corresponding to the target key are triggered to be inputted, thereby efficiently reducing the misoperation induced when adopting the virtual keyboard to execute the input operation.

In addition, when the touch feedback module includes a plurality of independent touch feedback elements, by controlling the touch feedback element corresponding to the key block to which the target key belongs to send the key stroke feedback information, the separate touch feedback to respective fingers is achieved, the feedback accuracy is improved, and the interference is avoided.

Furthermore, in the technical solutions provided by the embodiments of the present disclosure, in the virtual keyboard inputting mode, the touch feedback module is controlled to provide the key position feedback, the key stroke feedback and the force feedback to the user, and after exiting the virtual keyboard inputting mode, the touch device is restored to a normal touch interaction mode, thereby the normal touch interaction mode is not affected. The technical solutions provided by the embodiments of the present disclosure are suitable for any devices, platforms or application scenarios having requirements of virtual keyboard input.

Embodiments of devices of the present disclosure are described hereinafter, which may be used for performing methods of the present disclosure. For the details not described in the embodiments of devices of the present disclosure, the embodiments of methods of the present disclosure may be referred to.

Figure 5:
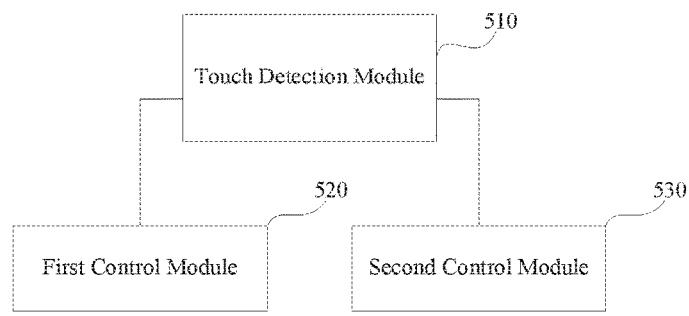
FIG. 5 is a block diagram illustrating an apparatus for inputting contents based on a virtual keyboard, according to an exemplary embodiment.

FIG. 5 is a block diagram illustrating an apparatus for inputting contents based on a virtual keyboard, according to an exemplary embodiment. The apparatus may be implemented as a part or whole of the touch device by using hardware circuits, or a combination of hardware and software. The apparatus may include: a touch detection module 510, a first control module 520, and a second control module 530.

The touch detection module 510 is configured to detect a touch operation corresponding to the virtual keyboard.

The first control module 520 is configured to control a touch feedback module to send key position feedback information according to a relative position between a touch position of the touch operation detected by the touch detection module 510 and keys of the virtual keyboard, the key position feedback information being configured to feed back to a user whether the touch operation meets a trigger condition of a target key.

The second control module 530 is configured to, when the touch operation detected by the touch detection module 510 meets the trigger condition of the target key and a touch pressure of the touch operation is greater than a pressure threshold value, receive contents input corresponding to the target key, and control the touch feedback module to send key stroke feedback information, the key stroke feedback information being configured to feed back to the user that the contents corresponding to the target key have been successfully inputted.

In sum, the apparatus provided by the present embodiment controls the touch feedback module to send the key position feedback information according to the relative position between the touch position of the touch operation and keys of the virtual keyboard, and when the touch operation meets the trigger condition of the target key and the touch pressure of the touch operation is greater than the pressure threshold value, inputs contents corresponding to the target key, and controls the touch feedback module to send key stroke feedback information; in this way, the problem in the related art of easily inducing the misoperation when using the virtual keyboard to execute the input operation is solved, the perception of the key position and the key stroke by the user is achieved, and only when accurately touching the target key and applying a certain pressure, the contents corresponding to the target key are triggered to be inputted, thereby efficiently reducing the misoperation induced when adopting the virtual keyboard to execute the input operation.

Figure 6:
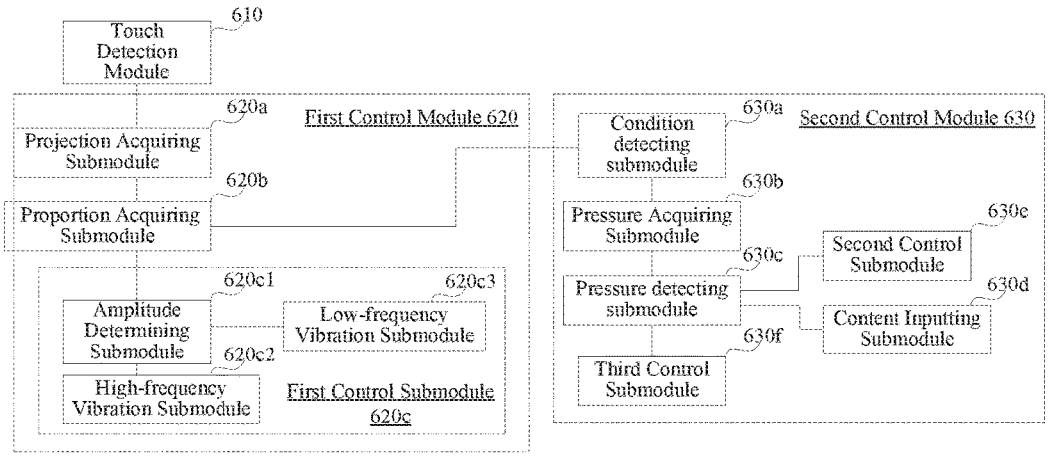
FIG. 6 is a block diagram illustrating an apparatus for inputting contents based on a virtual keyboard, according to another exemplary embodiment.

FIG. 6 is a block diagram illustrating an apparatus for inputting contents based on a virtual keyboard, according to another exemplary embodiment. The apparatus may be implemented as a part or whole of the touch device by using hardware circuits, or a combination of hardware and software. The apparatus may include: a touch detection module 610, a first control module 620, and a second control module 630.

The touch detection module 610 is configured to detect a touch operation corresponding to the virtual keyboard.

The touch device includes a touch panel. The touch detection module 610 detects the touch operation corresponding to the virtual keyboard via the touch panel. The virtual keyboard may be displayed in a display panel of the touch device, or may be projected and displayed on a surface of the touch device via a projecting mode.

The first control module 620 is configured to control a touch feedback module to send key position feedback information according to a relative position between a touch position of the touch operation detected by the touch detection module 610 and keys of the virtual keyboard, the key position feedback information being configured to feed back to a user whether the touch operation meets a trigger condition of a target key.

Alternatively, the first control module 620 includes a projection acquiring submodule 620a, a proportion acquiring submodule 620b, and a first control submodule 620c.

The projection acquiring submodule 620a is configured to acquire a projection region of a touch position of the touch operation detected by the touch detection module 610 in the virtual keyboard.

The touch position of the touch operation is generally a planar region having a certain area. The touch device determines a relative position between the touch position and keys of the virtual keyboard by acquiring the projection region of the touch position in the virtual keyboard acquired by the projection acquiring submodule 620a.

The proportion acquiring submodule 620b is configured to acquire a proportion of an overlapped region between the projection region acquired by the projection acquiring submodule 620a and the target key in the projection region.

The touch device acquires a proportion of an overlapped region between the projection region and the target key in the projection region by the proportion acquiring submodule 620b. The above projection region may be completely located in a display region corresponding to a certain key; or a part of the above projection region may be located in a display region corresponding to a certain key, and the other part is located outside the display region corresponding to the key, for example, the other part is located in a display region corresponding to another key and/or the other part is located in a spaced region between the certain key and another key.

In the present embodiment, when the projection region is completely located in the display region corresponding to a certain key, the touch device determines this key as the target key. When the projection region is partly located in the display region corresponding to a certain key, the touch device calculates proportions of the overlapped regions corresponding to one or more keys overlapped with the projection region in the above projection region respectively, and selects the key corresponding to the maximum proportion as the target key.

The proportion of the overlapped region between the projection region and the target key in the projection region may indicate whether the finger of the user touches the target key accurately. A big proportion indicates that the finger of the user is located at a center position of the target key, and the target key is touched accurately; whereas a small proportion indicates that the finger of the user is located at an edge position of the target key, and the target key is not accurately touched.

The first control submodule 620c is configured to control the touch feedback module to send key position feedback information according to the proportion acquired by the proportion acquiring submodule 620b.

The touch device controls the touch feedback module by the first control submodule 620c to send the key position feedback information according to the proportion acquired by the proportion acquiring submodule 620b. The key position feedback information is configured to feed back to the user whether the touch operation meets a trigger condition of the target key. The trigger condition of the target key includes: the proportion is greater than a proportion threshold value, for example, the proportion threshold value is about 70%. The proportion threshold value may be a value between 65% and 75%, or more preferably between 68% and 72%. With respect to difference values of the proportion, the touch feedback module sends different key position feedback information, so as to prompt the user whether the target key is touched accurately.

In the present embodiment, for example, a vibration module is used as the touch feedback module. Accordingly, the first control submodule 620c includes a vibration amplitude determining submodule 620c1, a high-frequency vibration submodule 620c2, and a low-frequency vibration submodule 620c3.

The vibration amplitude determining submodule 620c1 is configured to determine a vibration amplitude of the vibration module according to the proportion acquired by the proportion acquiring submodule 620b, where the vibration amplitude is in a negative correlation with the proportion.

When the proportion acquired by the proportion acquiring submodule 620b is greater than a first threshold value, the high-frequency vibration submodule 620c2 is configured to control the vibration module to vibrate at a high frequency according to the vibration amplitude determined by the vibration amplitude determining submodule 620c1 and a first preset frequency.

When the proportion acquired by the proportion acquiring submodule 620b is less than the first threshold value and is greater than a second threshold value, the low-frequency vibration submodule 620c3 is configured to control the vibration module to vibrate at a low frequency according to the vibration amplitude determined by the vibration amplitude determining submodule 620c1 and a second preset frequency.

The first preset frequency is greater than the second preset frequency.

Alternatively or additionally, the above vibration amplitude is in a negative correlation with the proportion. The closer the finger of the user to the center position of the target key is, the less the vibration amplitude is, and the softer the vibration being capable of perceived by the user is; and the closer the finger of the user to the edge position of the target key is, the greater the vibration amplitude is, and the stronger the vibration being capable of perceived by the user is. When the finger of the user is located at a border between two adjacent keys, the vibration amplitude reaches the maximum, and the vibration frequency is reduced, such that the user can definitely sense a strong vibration, and definitely prompt the user that the currently touched key position is not accurate. In addition, the above first and second threshold values may be set in advance in combination with the key layout of the virtual keyboard. For example, the first threshold value is 60%, and the second threshold value is 50%. The first threshold value may be a value between 55% and 65%, and the second threshold value may be a value between 45% and 55%.

By using the above mode, when the user senses a relatively strong vibration, he/she may move his/her finger to touch an accurate key position. During the procedure of moving the finger of the user, the user is guided to move his/her finger to the center position of the target key by adjusting the vibration amplitude and the frequency in real time, so as to meet the trigger condition of the target key.

As shown in FIG. 4B, when the touch position of the finger of the user is located at the center position of the key "J", the high-frequency vibration submodule 620c2 vibrates at a high frequency according to a vibration rhythm curve 41 shown in FIG. 4B, and at this time, the vibration amplitude is the smallest. As shown in FIG. 4C, when the touch position of the finger of the user swipes towards the edge position from the center position of the key "J", the high-frequency vibration submodule 620c2 vibrates at a high frequency according to a vibration rhythm curve 42 shown in FIG. 4C, and during the swiping, the vibration amplitude increases gradually. As shown in FIG. 4D, when the touch position of the finger of the user is swiping at the edge position of the key "J" and the key "H", the low-frequency vibration submodule 620c3 vibrates at a low frequency according to a vibration rhythm curve 43 shown in FIG. 4D, and at this time, the vibration amplitude is the greatest.

In addition, when the touch feedback module includes a plurality of independent touch feedback elements, the touch device controls the touch feedback element corresponding to the key block to which the target key belongs to send the above key position feedback information, so as to achieve the touch feedback to respective finger separately, thereby improving the feedback accuracy, and avoiding interference.

The second control module 630 is configured to, when the touch operation detected by the touch detection module 610 meets the trigger condition of the target key and a touch pressure of the touch operation is greater than a pressure threshold value, receive contents input corresponding to the target key, and control the touch feedback module to send key stroke feedback information, the key stroke feedback information being configured to feed back to the user that the contents corresponding to the target key have been successfully inputted.

Alternatively, the second control module 630 includes: a condition detecting submodule 630a, a pressure acquiring submodule 630b, a pressure detecting submodule 630c, a content inputting submodule 630d, and a second control submodule 630e.

The condition detecting submodule 630a is configured to detect whether the touch operation detected by the touch detection module 610 meets a trigger condition of the target key. The trigger condition of the target key includes: a proportion of the overlapped region in a projection region is greater than a proportion threshold value. The projection region indicates a projection region of the touch position of the touch operation in the virtual keyboard, and the overlapped region indicates an overlapped region between the projection region and the target key.

The touch device detects in real time via the condition detecting submodule 630a whether the touch operation meets the trigger condition of the target key, i.e., detect whether the proportion acquired by the proportion acquiring submodule 620b is greater than the proportion threshold value.

The pressure acquiring submodule 630b is configured to acquire a touch pressure of the touch operation by a pressure sensitive module in the case that the condition detecting submodule 630a detects that the touch operation meets the trigger condition of the target key.

The touch device further includes a pressure sensitive module. The pressure acquiring submodule 630b acquires the touch pressure of the touch operation via the pressure sensitive module. The pressure sensitive module may be a capacitive type, or a resistive type. The corresponding different pressure detection modes have been introduced before, and would not be elaborated herein.

The pressure detecting submodule 630c is configured to detect whether the touch pressure acquired by the pressure acquiring submodule 630b is greater than a pressure threshold value.

The content inputting submodule 630d is configured to receive contents input corresponding to the target key in the case that the pressure detecting submodule 630c detects that the touch pressure is greater than the pressure threshold value.

The second control submodule 630e is configured to control the touch feedback module to send key stroke feedback information in the case that the pressure detecting submodule 630c detects that the touch pressure is greater than the pressure threshold value.

During the procedure of pressing the touch panel by the finger of the user, the touch pressure increases gradually. When the touch pressure is greater than the pressure threshold value, the touch device inputs contents corresponding to the target key via the content inputting submodule 630d. The contents corresponding to the target key may be a character, an instruction, or other content, which is not limited by the present embodiment. Moreover, the touch device controls the touch feedback module to send the key stroke feedback information via the second control submodule 630e. The key stroke feedback information is configured to feed back to the user that the content corresponding to the target key has been successfully inputted.

Still using the example that the touch feedback module is the vibration module, the second control submodule 630e is configured to control the vibration module to perform a first mode vibration according to a first preset vibration amplitude and a third preset frequency. The first mode vibration is configured to simulate a touch sense of typing on the key. The first preset vibration amplitude may be set to be a relatively big value, and the third preset frequency may be set to be a relatively small value, such that the user may sense a short and strong vibration and simulate the touch sense of typing on the key.

Alternatively, the second control module 630 further concludes: a third control submodule 630f. The third control submodule 630f is configured to control the vibration module to perform a second mode vibration according to a second preset vibration amplitude and a fourth preset frequency during the gradual reduction of the touch pressure. The second mode vibration is configured to simulate the force feedback during the bounce back of the key.

During the procedure of retracting the finger of the user after the input is completed, i.e., during the procedure that the touch pressure is gradually reduced, the touch device controls the vibration module to perform a second mode vibration according to a second preset vibration amplitude and a fourth preset frequency via the third control submodule 630f. The second mode vibration is configured to simulate the force feedback during the bounce of the key. The second preset vibration amplitude may be set to be a relatively small value or may be set to be a variable reduced gradually, and the fourth preset frequency may be set to be a relatively big value, such that the user may sense a progressively softening vibration and simulate the force feedback during the bounce of the key.

In addition, when the touch feedback module includes a plurality of independent touch feedback elements, the touch device controls the touch feedback element corresponding to the key block to which the target key belongs to send the above key stroke feedback information, so as to achieve the touch feedback to respective fingers separately, thereby improving the feedback accuracy, and avoiding interference.

In sum, the apparatus provided by the present embodiment controls the touch feedback module to send the key position feedback information according to the relative position between the touch position of the touch operation and keys of the virtual keyboard, and when the touch operation meets the trigger condition of the target key and the touch pressure of the touch operation is greater than the pressure threshold value, inputs contents corresponding to the target key, and controls the touch feedback module to send key stroke feedback information; in this way, the problem in the related art of easily inducing the misoperation when using the virtual keyboard to execute the input operation is solved, the perception of the key position and the key stroke by the user is achieved, and only when accurately touching the target key and applying a certain pressure, the contents corresponding to the target key are triggered to be inputted, thereby efficiently reducing the misoperation induced when adopting the virtual keyboard to execute the input operation.

In addition, when the touch feedback module includes a plurality of independent touch feedback elements, by controlling the touch feedback element corresponding to the key block to which the target key belongs to send the key stroke feedback information, the separate touch feedback to respective fingers is achieved, the feedback accuracy is improved, and the interference is avoided.

It should be explained that the apparatuses provided by the above embodiments are only exemplified to be divided as the above respective functional modules when achieving their functions. In actual applications, the above functions may be distributed to be achieved by different functional modules according to requirements, i.e., the interior structure of the devices may be divided into different functional modules for achieving all or a part of the above described functions.

With respect to the apparatus in the above embodiments, the specific manners for performing operations for individual modules therein have been described in detail in the embodiments regarding the methods, which will not be elaborated herein.

An exemplary embodiment of the present disclosure further provides a touch device, which is capable of achieving the method for inputting contents by using a virtual keyboard provided by the present disclosure. The touch device includes: a processor, and a memory, a touch panel, a pressure sensitive module, and a touch feedback module electrically connected to the processor. The touch panel is located above the pressure sensitive module, and the pressure sensitive module is located above the touch feedback module. The memory is configured to store executable instructions of the processor.

The processor is configured to: detect a touch operation corresponding to the virtual keyboard via a touch panel; control a touch feedback module to send key position feedback information according to a relative position between a touch position of the touch operation and keys of the virtual keyboard, the key position feedback information being configured to feed back to a user whether the touch operation meets a trigger condition of a target key. When the touch operation meets the trigger condition of the target key and a touch pressure of the touch operation detected by a pressure sensitive module is greater than a pressure threshold value, the processor may receive contents input corresponding to the target key, and the processor may control the touch feedback module to send key stroke feedback information, where the key stroke feedback information is configured to feed back to the user that the contents corresponding to the target key have been successfully inputted.

In a possible implementation manner, the virtual keyboard is a virtual keyboard manipulated by both hands, the touch feedback module includes 10 independent touch feedback elements, and each touch feedback element corresponds to a key block corresponding to one finger. The above key position feedback information and the key stroke feedback information are sent by the touch feedback element corresponding to the key block to which the target key belongs.

In another possible implementation manner, the virtual keyboard is a virtual keyboard manipulated by both thumbs, the touch feedback module includes 2 independent touch feedback elements, and each touch feedback element corresponds to a key block corresponding to one thumb. The above key position feedback information and the key stroke feedback information are sent by the touch feedback element corresponding to the key block to which the target key belongs.

In further another possible implementation manner, the virtual keyboard is a virtual keyboard manipulated by one thumb, the touch feedback module includes 1 independent touch feedback element, and the above key position feedback information and the key stroke feedback information are sent by the touch feedback element.

Figure 7:
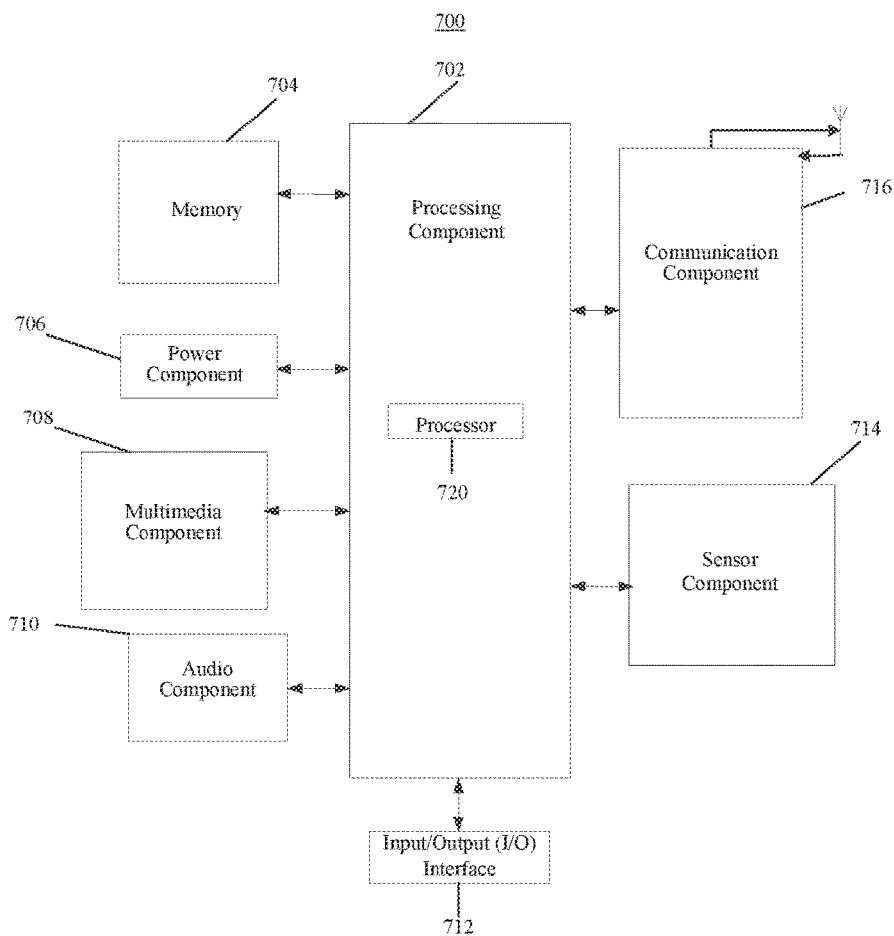
FIG. 7 is a block diagram illustrating an apparatus, according to another exemplary embodiment.

FIG. 7 is a block diagram illustrating an apparatus 700, according to an exemplary embodiment. The apparatus 700 may be a mobile phone, a computer, a digital broadcast terminal, a messaging device, a gaming console, a tablet, a medical device, exercise equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700), such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, videos, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a distance sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

In exemplary embodiments, there is also provided a non-transitory computer-readable storage medium including instructions, such as included in the memory 704, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by a processor of the apparatus 700, enables the apparatus 700 to perform the above method.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method, comprising:
    detecting a touch operation corresponding to a virtual keyboard;
    controlling a touch feedback module to send key position feedback information according to a relative position between a touch position of the touch operation and keys of the virtual keyboard, the key position feedback information configured to feed back to a user whether the touch operation meets a trigger condition of a target key; and
    when the touch operation meets the trigger condition of the target key and a touch pressure of the touch operation is greater than a pressure threshold value, inputting contents corresponding to the target key, and controlling the touch feedback module to send key stroke feedback information, the key stroke feedback information configured to feed back to the user that the contents corresponding to the target key have been successfully inputted,
    wherein controlling the touch feedback module to send the key position feedback information according to the relative position between the touch position of the touch operation and the keys of the virtual keyboard comprises:
    acquiring a projection region of the touch position of the touch operation in the virtual keyboard;
    acquiring a proportion of an overlapped region between the projection region and the target key in the projection region; and
    controlling the touch feedback module to send the key position feedback information according to the proportion.

2. The method of claim 1, wherein the touch feedback module comprises a vibration module; and
    the controlling the touch feedback module to send the key position feedback information according to the proportion comprises:
    determining a vibration amplitude of the vibration module according to the proportion, the vibration amplitude being in a negative correlation with the proportion;
    when the proportion is greater than a first threshold value, controlling the vibration module to vibrate at a high frequency according to the vibration amplitude and a first preset frequency; and
    when the proportion is less than the first threshold value and is greater than a second threshold value, controlling the vibration module to vibrate at a low frequency according to the vibration amplitude and a second preset frequency,
    wherein the first preset frequency is greater than the second preset frequency.

3. The method of claim 1, wherein inputting contents corresponding to the target key, and controlling the touch feedback module to send the key stroke feedback information when the touch operation meets the trigger condition of the target key and the touch pressure of the touch operation is greater than the pressure threshold value comprises:
    detecting whether the touch operation meets the trigger condition of the target key, wherein the trigger condition of the target key comprises a proportion of an overlapped region in a projection region is greater than a proportion threshold value, the projection region indicates a projection region of the touch position of the touch operation in the virtual keyboard, and the overlapped region indicates an overlapped region between the projection region and the target key;
    when the touch operation meets the trigger condition of the target key, acquiring the touch pressure of the touch operation by a pressure sensitive module;
    detecting whether the touch pressure is greater than a pressure threshold value; and
    when the touch pressure is greater than the pressure threshold value, inputting contents corresponding to the target key, and controlling the touch feedback module to send the key stroke feedback information.

4. The method of claim 3, wherein the touch feedback module comprises a vibration module; and
    wherein controlling the touch feedback module to send the key stroke feedback information comprises:
    controlling the vibration module to perform a first mode vibration according to a first preset vibration amplitude and a third preset frequency, wherein the first mode vibration is configured to simulate a touch sense of typing on the key.

5. The method of claim 4, further comprising:
during a procedure in which the touch pressure is gradually reduced, controlling the vibration module to perform a second mode vibration according to a second preset vibration amplitude and a fourth preset frequency,
wherein the second mode vibration is configured to simulate a force feedback during a bounce of the key.

6. A touch device, comprising: a processor, and a memory, a touch panel, a pressure sensitive module, and a touch feedback module electrically connected to the processor, wherein the touch panel is located above the pressure sensitive module, the pressure sensitive module is disposed above the touch feedback module, and the memory is configured to store executable instructions of the processor,
wherein the processor is configured to:
detect a touch operation corresponding to a virtual keyboard via the touch panel;
acquire a projection region of the touch position of the detected touch operation in the virtual keyboard;
acquire a proportion of an overlapped region between the acquired projection region and the target key in the projection region; and
send the key position feedback information according to the acquired proportion, the key position feedback information being configured to feed back to a user whether the touch operation meets a trigger condition of a target key; and
when the touch operation meets the trigger condition of the target key and a touch pressure of the touch operation detected by the pressure sensitive module is greater than a pressure threshold value, receive contents input corresponding to the target key, and control the touch feedback module to send key stroke feedback information, the key stroke feedback information being configured to feed back to the user that the contents corresponding to the target key have been successfully inputted.

7. The touch device of claim 6, wherein the virtual keyboard comprises a first virtual keyboard manipulated by both hands, the touch feedback module comprises ten independent touch feedback elements, each touch feedback element corresponds to a key block corresponding to one finger, and the key position feedback information and the key stroke feedback information are sent by the touch feedback element corresponding to the key block to which the target key belongs.

8. The touch device of claim 6, wherein the virtual keyboard comprises a second virtual keyboard manipulated by both thumbs, the touch feedback module comprises two independent touch feedback elements, each touch feedback element corresponds to a key block corresponding to one thumb, and the key position feedback information and the key stroke feedback information are sent by the touch feedback element corresponding to the key block to which the target key belongs.

9. The touch device of claim 6, wherein the virtual keyboard comprises a third virtual keyboard manipulated by one thumb, the touch feedback module comprises one touch feedback element, and the key position feedback information and the key stroke feedback information are sent by the touch feedback element.

10. The touch device of claim 6, wherein the touch feedback module is a vibration module; and wherein the processor is further configured to:
determine a vibration amplitude of the vibration module according to the acquired proportion, the vibration amplitude being in a negative correlation with the proportion;
when the acquired proportion is greater than a first threshold value, control the vibration module to vibrate at a high frequency according to the determined vibration amplitude and a first preset frequency; and
when the acquired proportion is less than the first threshold value and is greater than a second threshold value, control the vibration module to vibrate at a low frequency according to the determined vibration amplitude and a second preset frequency,
wherein the first preset frequency is greater than the second preset frequency.

11. The touch device of claim 6, wherein the processor is further configured to:
detect whether the detected touch operation meets the trigger condition of the target key, wherein the trigger condition of the target key comprises a proportion of an overlapped region in a projection region is greater than a proportion threshold value, the projection region indicates a projection region of the touch position of the touch operation in the virtual keyboard, and the overlapped region indicates an overlapped region between the projection region and the target key;
when it is detected that the touch operation meets the trigger condition of the target key, acquire the touch pressure of the touch operation by the pressure sensitive module;
detect whether the acquired touch pressure is greater than a pressure threshold value;
when it is detected that the touch pressure is greater than the pressure threshold value, receive contents input corresponding to the target key; and
when it is detected that the touch pressure is greater than the pressure threshold value, control the touch feedback module to send the key stroke feedback information.

12. The touch device of claim 11, wherein the touch feedback module is a vibration module; and
the processor is further configured to control the vibration module to perform a first mode vibration according to a first preset vibration amplitude and a third preset frequency,
wherein the first mode vibration is configured to simulate a touch sense of typing on the key.

13. The touch device of claim 12, wherein the processor is further configured to:
during a procedure in which the touch pressure is gradually reduced, control the vibration module to perform a second mode vibration according to a second preset vibration amplitude and a fourth preset frequency,
wherein the second mode vibration is configured to simulate a force feedback during a bounce of the key.

14. A non-transitory readable storage medium comprising instructions, executable by a processor in a touch device, for performing acts comprising:
detecting a touch operation corresponding to a virtual keyboard;
controlling a touch feedback module to send key position feedback information according to a relative position between a touch position of the touch operation and keys of the virtual keyboard, the key position feedback information being configured to feed back to a user whether the touch operation meets a trigger condition of a target key; and when the touch operation meets the trigger condition of the target key and a touch pressure of the touch operation is greater than a pressure threshold value, inputting contents corresponding to the target key, and controlling the touch feedback module to send key stroke feedback information, the key stroke feedback information being configured to feed back to the user that the contents corresponding to the target key have been successfully inputted, wherein controlling the touch feedback module to send the key position feedback information according to the relative position between the touch position of the touch operation and the keys of the virtual keyboard comprises:

acquiring a projection region of the touch position of the touch operation in the virtual keyboard;

acquiring a proportion of an overlapped region between the projection region and the target key in the projection region; and controlling the touch feedback module to send the key position feedback information according to the proportion.

15. The non-transitory readable storage medium of claim 14, wherein the virtual keyboard comprises a first virtual keyboard manipulated by both hands, the touch feedback module comprises ten independent touch feedback elements, each touch feedback element corresponds to a key block corresponding to one finger, and the key position feedback information and the key stroke feedback information are sent by the touch feedback element corresponding to the key block to which the target key belongs.

16. The non-transitory readable storage medium of claim 14, wherein the virtual keyboard comprises a second virtual keyboard manipulated by both thumbs, the touch feedback module comprises two independent touch feedback elements, each touch feedback element corresponds to a key block corresponding to one thumb, and the key position feedback information and the key stroke feedback information are sent by the touch feedback element corresponding to the key block to which the target key belongs.

17. The non-transitory readable storage medium of claim 14, wherein the virtual keyboard comprises a third virtual keyboard manipulated by one thumb, the touch feedback module comprises one touch feedback element, and the key position feedback information and the key stroke feedback information are sent by the touch feedback element.

18. The non-transitory readable storage medium of claim 14, wherein the acts further comprise:

determining a vibration amplitude of the vibration module according to the proportion, the vibration amplitude being in a negative correlation with the proportion.

* * * * *